United States Patent [19]

Jennings

[11] 4,234,834
[45] Nov. 18, 1980

[54] D.C. MOTOR DIRECTIONAL CONTROL

[75] Inventor: G. B. Jennings, St. Louis, Mo.

[73] Assignee: The Pandjiris Weldment Co., St. Louis, Mo.

[21] Appl. No.: 2,248

[22] Filed: Jan. 10, 1979

[51] Int. Cl.³ .............................................. H02P 1/22
[52] U.S. Cl. .................................. 318/285; 318/291; 318/293
[58] Field of Search ............... 318/291, 283, 285, 280, 318/287, 293, 294, 139

[56] References Cited

U.S. PATENT DOCUMENTS

| | | | |
|---|---|---|---|
| 3,549,971 | 12/1970 | Van Patten et al. | 318/294 |
| 4,057,752 | 11/1977 | Artrip et al. | 318/139 |

*Primary Examiner*—David Smith, Jr.
*Attorney, Agent, or Firm*—Cohn, Powell & Hind

[57] ABSTRACT

A D.C. motor directional control in which relays switch the polarity of the D.C. voltage applied to the motor armature in order to obtain forward or reverse operation of the D.C. motor. A SCR is connected in the armature circuit to control the current of the armature circuit. A control circuit which includes a triggering circuit for the SCR is responsible for the sequential operation of the armature relay contacts and the firing of the SCR. Contacts on forward and reverse relays actuate a common relay, which in turn actuates the SCR triggering circuit. Either the forward or reverse relay must be actuated before the common relay will be actuated, therefore, the forward or reverse relay contacts in the armature circuit close before the common relay actuates the SCR triggering circuit. A delay circuit includes a capacitor connected in parallel with the forward and reverse relays. While the appropriate relay is actuated, the capacitor charges, and when the relay is deactivated, the capacitor discharges through the relay tending to hold it in an actuated state for a period of time. During this time period, the SCR commutates, shutting off the current in the armature circuit. The forward and reverse relay contacts in the armature circuit are not subject to the flow of current in the armature circuit at the time they are opening or closing and, therefore, need not be rated for make and break currents.

6 Claims, 2 Drawing Figures

D.C. MOTOR DIRECTIONAL CONTROL

BACKGROUND OF THE INVENTION

This invention relates to a directional control for a D.C. motor.

Many D.C. motor directional controls operate with relays to switch the polarity of the electric current applied to the motor armature winding. In the process, the relays also make and break the armature current. The relays, therefore, must not only be rated for current carrying capacity, but, must also be rated for make and break currents. This results in the requirement of larger and more costly relay contacts than would be required if the contacts merely had to be rated for current carrying capacity.

SUMMARY OF THE INVENTION

The improved directional control for a D.C. motor provides a directional switching means that is not subject to the flow of armature current at the time of the switching action.

Switching means are operatively connected to a motor armature circuit to control the polarity of the direct current applied to the motor armature winding. A SCR silicone controlled rectifier is connected in the armature circuit to control the current of the armature circuit. A control means operatively connects the SCR to the switching means. The control means includes a trigger means which is operatively connected to the SCR for providing a trigger signal to the SCR to turn the SCR on. The control means operatively connects the trigger means and the switching means for allowing the switching means to close before a trigger signal is provided to the SCR.

The switching means includes forward and reverse relay means that are selectively activated. Included in the control means is a common relay means which is operatively connected to the forward and reverse relay means and is actuated selectively by either the forward or reverse relay means for providing the trigger signal to the SCR.

In one aspect, the forward and reverse relay means includes sets of armature relay contacts which selectively connect the armature winding to the positive and negative sides of the armature circuit. The forward relay means when actuated closes the forward armature relay contacts which connect the first side of the armature winding to the positive side of the armature circuit and the second opposite side of the armature winding to the negative side of the armature circuit. The reverse armature relay means, when actuated, closes the reverse relay contacts which connects the second side of the armature winding to the positive side of the armature circuit and the first side of the armature winding to the negative side of the armature circuit.

A set of control contacts are included in the forward and reverse relay means, and are operatively connected to the common relay means, and actuate the common relay means upon actuation of the corresponding forward or reverse relay means. The respective armature relay contacts and control contacts operate approximately simultaneously, and the common relay means is actuated a finite period of time after the actuation of the control contacts. This time period is determined by the operating time of the control relay means. This finite period of time provides a lag between the closing of the armature contacts and the actuation of the trigger means to trigger the SCR.

In one aspect, the control means includes a delay means which is operatively connected to the forward and reverse relay means, and which provides a time interval between the deactivation of the trigger signal to the SCR and the deactivation of the selectively engaged forward or reverse relay means. This time interval is of sufficient length to allow the SCR to commutate prior to the deactivation of the respective forward or reverse relay means.

In one aspect, the forward and reverse relay means are actuated by the connection of the respective relay means to a control voltage power supply, the relays being deactivated by disconnecting the relays from the control voltage power supply. The delay means including a capacitor connected in parallel with the forward and reverse relay means. When the forward or reverse relay means is actuated, the associated capacitor charges. When the relay means is disconnected from the control voltage power supply, the associated capacitor discharges through the relay means, retaining the relay means in an actuated condition for a predetermined time interval. This sequencing, relieves the forward and reverse relay means armature contacts from making and breaking the armature current.

DESCRIPTION OF THE PREFERRED EMBODIMENT

Figure 1:
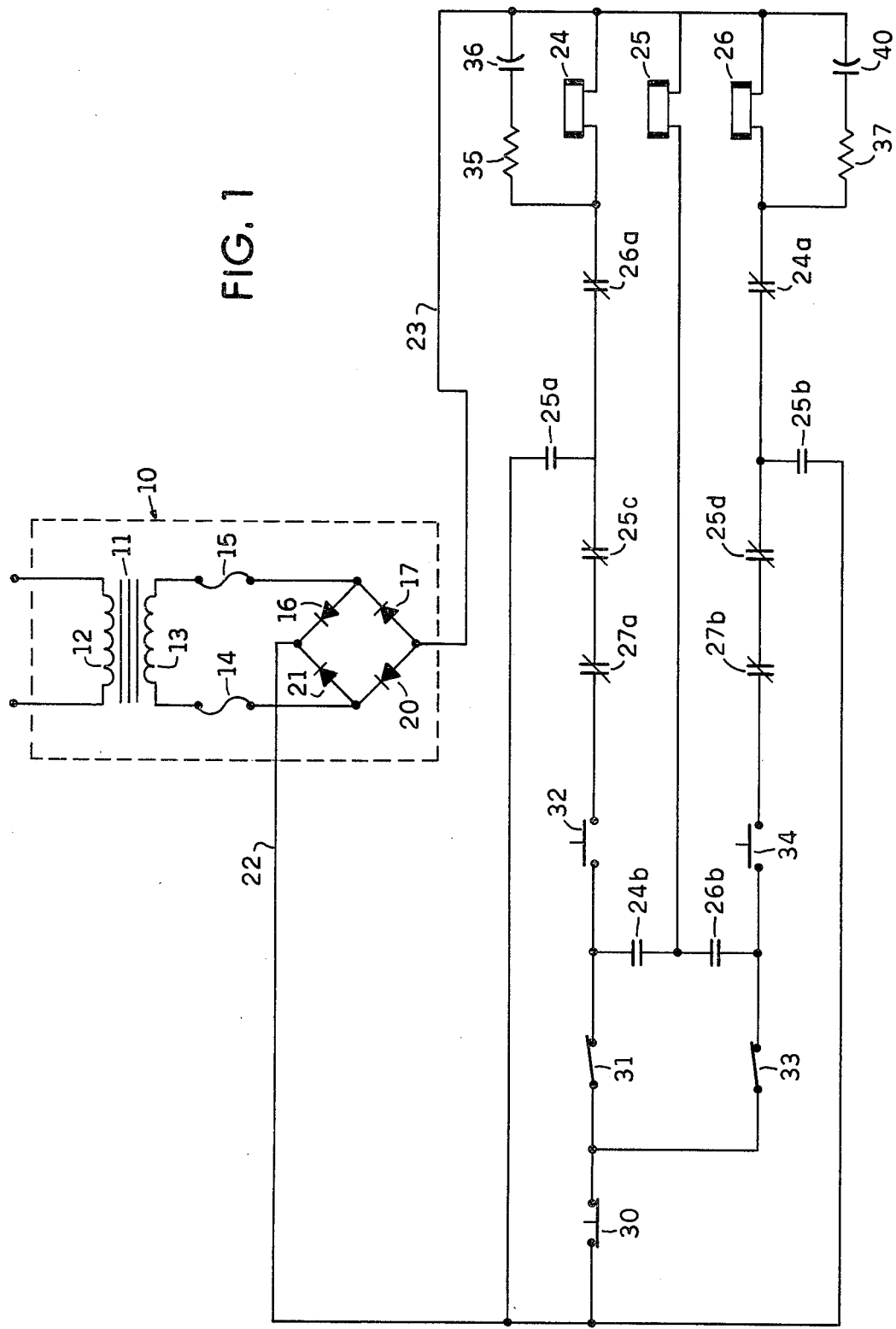
FIG. 1 is a circuit diagram of the control means and switching means.

Referring now by characters of reference to the drawings, a control voltage power supply indicated generally by 10 is shown in FIG. 1. Included in the control voltage power supply 10 is a transformer 11 having a primary 12 and a secondary 13. The primary 12 is connected to a source of A.C. voltage (not shown) typically 115 volts. The secondary 13 is connected through fuses 14 and 15 to diodes 16,17,20 and 21 which are connected in the form of a full wave bridge circuit.

The junction of diodes 16 and 21 is the positive output of the control voltage power supply 10 and is connected to a positive control line 22. The junction of diodes 17 and 20 is the negative output of the control voltage power supply 10 and is connected to a negative control line 23.

The negative control line 23 is connected to the negative sides of a forward relay coil 24 of a forward relay means, a common relay coil 25 of a common relay means and a reverse relay coil 26 of a reverse relay means. The forward relay coil 24 controls normally closed contacts 24a and normally open relay control contacts 24b shown in FIG. 1, and normally open relay contacts 24c and 24d and normally closed relay contacts 24e shown in FIG. 2.

Figure 2:
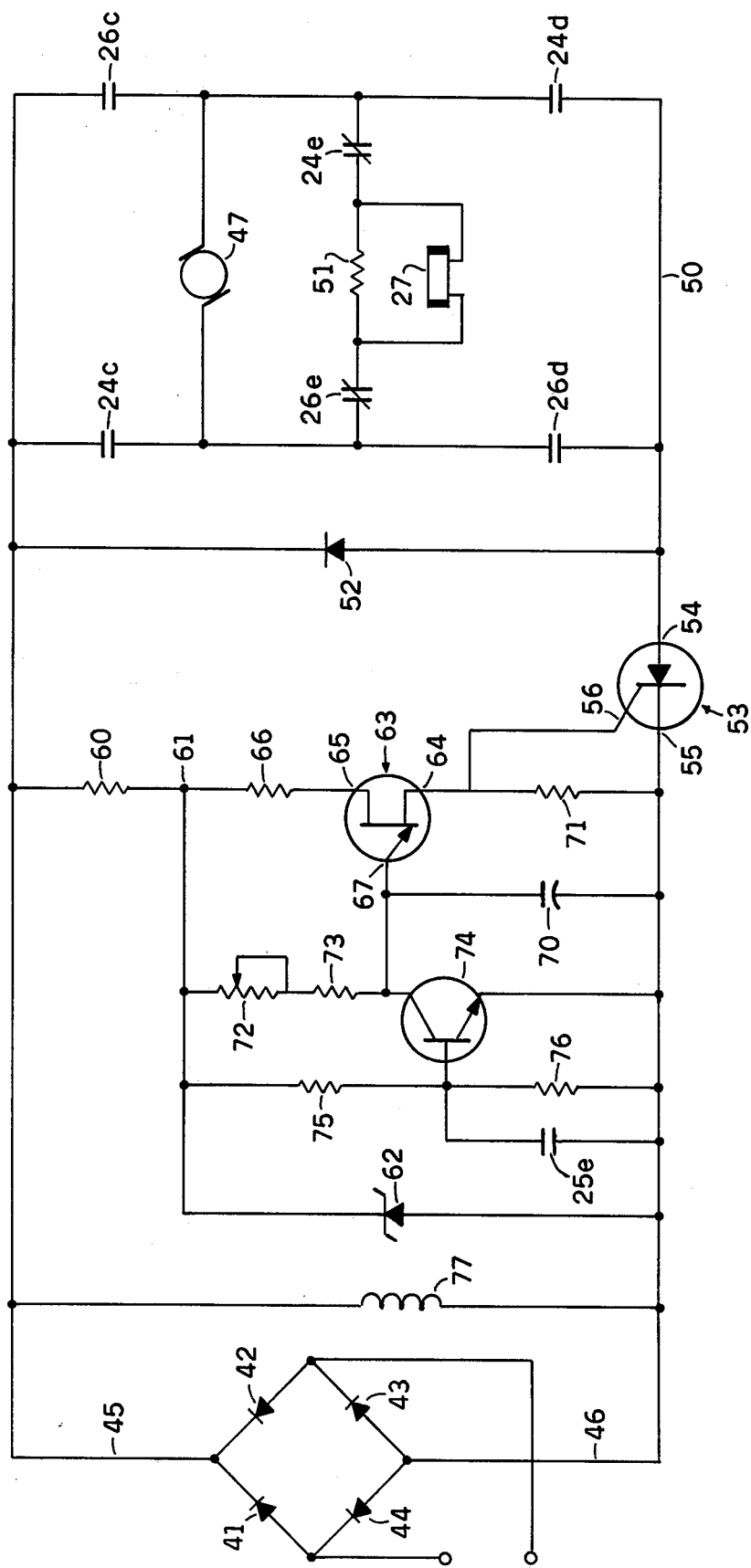
FIG. 2 is a compatible circuit diagram of the armature circuit operatively connected to the control means.

The reverse relay coil 26 controls normally closed relay contacts 26a and normally open relay control contacts 26b shown in FIG. 1, and normally open relay contacts 26c and 26d and normally closed relay contacts 26e shown in FIG. 2. The forward relay coil 24 and controls 24c-d, and reverse relay coil 26 and contacts 26c-d, constitute a switching means.

A control means includes the common relay coil 25 that controls normally open relay contacts 25a and 25b and normally closed relay contacts 25c and 25d shown in FIG. 1, and normally open relay contacts 25e shown in FIG. 2.

Normally closed relay contacts 27a and 27b shown in FIG. 1 are controlled by an antiplugging relay coil 27 shown in FIG. 2. A normally closed stop switch means 30 is connected to the positive control line 22. In series with the stop switch means 30 are a limit switch 31, a normally open forward switch 32, and the normally closed relay contacts 27a, 25c and 26a. The negative side of contacts 26a is connected to the positive side of forward relay coil 24.

Also connected in series with stop switch means 30 are a limit switch 33, a normally open reverse switch 34, and normally closed relay contacts 27b, 25d and 24a. The negative side of relay contacts 24a is connected to the positive side of reverse relay coil 26. The normally open relay contacts 25a are connected between the positive control line 22 and the point of connection of relay contacts 25c and 26a. The normally open relay contacts 25b are connected between the positive control line 22 and the points of connections of relay contacts 25d and 24a.

Connected between the point of connection of limit switch 31 and forward switch 32, and the positive side of common relay coil 25 are normally open relay contacts 24b. The normally open relay contacts 26b are connected between the point of connection of limit switch 33 and reverse switch 34, and the positive side of common relay coil 25.

A series circuit of resistor 35 and delay capacitor 36 is connected in parallel with the forward relay coil 24. Connected in parallel with the reverse relay coil 26 is a series circuit of resistor 37 and a delay capacitor 40.

Referring to FIG. 2, diodes 41, 42, 43 and 44 are connected to form a full wave bridge circuit. The junctions of the diodes 41 and 44 and of the diodes 42 and 43 are connected to an A.C. power source (not shown) typically, 110 volts, 60 hertz. The junction of the diodes 41 and 42 is the positive output of the bridge circuit and is connected to a positive armature line 45. The junction of the diodes 43 and 44 is the negative output and is connected to a negative armature line 46.

A motor armature winding 47 is connected on one side to the normally open relay contacts 24c and 26d, the opposite side of said relay contacts 24c and 26d being connected to positive armature line 45 and a SCR line 5 respectively. The opposite side of motor armature winding 47 is connected to normally open relay contacts 26c and 24d, the opposite sides of said relay contacts 26c and 24d being connected to the positive armature line 45 and the SCR line 50 respectively. A series circuit, consisting of the normally closed relay contacts 26e, a dynamic breaking resistor 51 and the normally closed relay contacts 24e, is connected in parallel with the motor armature winding 47. The antiplugging relay coil 27 is connected in parallel with the dynamic breaking resistor 51.

A freewheeling diode 52 is connected on its anode side to the SCR line 50, while its cathode side is connected to the positive armature line 45.

A SCR 53 has its anode 54 connected to the SCR line 50, and has its cathode 55 connected to the negative armature line 46.

A voltage dropping resistor 60 is connected to the positive armature line 45. The opposite end of said voltage dropping resistor 60 is connected to a junction point 61. A Zener diode 62 has its cathode connected to the junction point 61 and its anode connected to the negative armature line 46. The Zener diode 62 cooperates with the voltage dropping resistor 60 to drop the voltage at the junction point 61 to a predetermined value.

A trigger means includes a unijunction transistor 63 having a first base 64 which is connected to the gate 56 of the SCR 53. A second base 65 of the unijunction transistor 63 is connected to the point 61 by a resistor 66. An emitter 67 of the unijunction transistor 63 is connected to a capacitor 70. The other end of the capacitor 70 is connected to the negative armature line 46. Connected from the first base 64 to negative armature line 46, is a resistor 71.

A speed control variable resistor 72 and a resistor 73 are connected in series from the point 61 to the emitter 67. Also connected to the emitter 67 is the collector of an NPN transistor 74. The emitter of the transistor 74 is connected to the negative armature line 46. A biasing resistor 75 connects the junction point 61 to the base of the transistor 74, while a resistor 76 connects the base of the transistor 74 to the negative armature line 46. The normally open relay contacts 25e are connected in parallel with the resistor 76. A motor shant field winding 77 is connected between the positive and negative armature lines 45 and 46.

The operation of the motor control will now be described. Referring to FIG. 1 when forward switch 32 is depressed, a circuit from positive control line 22 to the positive side of relay coil 24 is completed, and the relay coil 24 actuates the associated relay contacts 24a, 24b, 24c, 24d and 24e. The relay contact 24a opens, disabling the reverse relay coil 26. The normally open relay contact 24b closes, actuating the common relay coil 25. In FIG. 2, the normally opened relay contacts 24c and 24d close, connecting the armature winding 47 to the positive armature line 45 and the SCR line 50 for operation of the motor in a first or forward direction. The normally closed relay contacts 24e open, disconnecting the dynamic breaking resistor 51 and the antiplugging relay 27 from the motor armature winding 47.

The common relay coil 25 actuates its associated relay contacts 25a, 25b, 25c, 25d and 25e a finite period of time after the actuation of the relay contacts 24a–e associated with the forward relay coil 24. This time period is determined by the operating time of the common relay coil 25 and its associated contacts 25a–e. The relay contact 25c opens, disconnecting the forward relay coil 24 from the positive control line 22, while the normally open relay contacts 25a close, reconnecting the forward relay coil 24 to the positive control line 22. The relay contacts 25b close, while the relay contacts 25d open. However, the reverse relay coil 26 is not energized as the relay contacts 24a are open. The capacitor 36 charges through the resistor 35 to the voltage of the positive control line 22. In FIG. 2, the normally open relay contacts 25e close, effectively shorting out the resistor 76.

While the relay contacts 25e were in an open state, the transistor 74 was in a forward bias or "on" state. The resistors 72, 73, 75 and 76 provide bias voltages to the transistor 74. While the transistor 74 is "on" the capacitor 70 is effectively shorted through the transistor 74. When the contacts 25e close, the transistor 74 is no longer forward biased and turns "off." The capacitor 70 then charges through the speed control variable resistor 72 and resistor 73. When the capacitor 70 charges to a predetermined value, the unijunction transistor 63 turns "on" allowing capacitor 70 to discharge through resistor 71. This discharge provides a trigger signal to trigger the SCR 53. When the SCR 53 is triggered, it turns "on" and current can then flow through the armature winding 47 and the SCR 53, and the motor is operated in a forward direction.

It will be understood that the armature winding 47 is connected in the armature circuit before the trigger signal is provided to the SCR 53 so that the forward relay contacts 24c–d are not subjected to armature current when they close.

Since the output of the transistor 41, 42, 43 and 44 bridge circuit on positive armature line 45 is a full wave rectified D.C. voltage 120 times each second, the voltage present on positive armature line 45 will equal zero. When the voltage on positive armature line 45 equals zero, any current produced by the motor armature circuit, as the motor freewheels, passes through freewheeling diode 52 which is effectively connected in parallel with the motor armature winding 47, and prevents current flow through the SCR 53, allowing the SCR 53 to commutate or turn "off."

As the voltage on positive armature line 45 increases from zero, capacitor 70 will again charge and trigger the SCR 53. Speed control of the motor is accomplished by selecting the time on the positive wave form from the zero value at which the SCR 53 is triggered. This time is determined by the value of the capacitor 70 and the speed control variable resistors 72 and 73. As the variable resistor 73 is varied, the time on the wave form at which the capacitor 70 is sufficiently charged to turn "on" the unijunction transistor 63 is changed. Speed control of the motor is accomplished by varying the time on the positive wave form that the SCR 53 is triggered, thereby varying the average voltage supplied to the armature winding 47.

Reverse operation is similiar to that of forward operation of the motor control. The reverse button 34 is depressed, actuating the reverse relay coil 26 which actuates the relay contacts 26c and 26d to connect the motor armature winding 47 to the positive armature line 45 and SCR line 50, with the opposite polarity voltage being applied to the motor armature winding 47. The reverse relay coil 26 also actuates the common relay coil 25 through the relay contacts 26b, and disconnects the forward relay coil 24 by opening the relay contacts 26a.

It will be understood that the armature winding 47 is connected in the armature circuit before the trigger signal is provided to the SCR 53 so that the reverse relay controls 26c–d are not subjected to armature current when they close.

When the motor is to be stopped, the stop switch means 30 is depressed. This disconnects the common relay coil 25 from the positive control line 22. The normally open relay contacts 25a and 25d open disconnecting either the forward or reverse relay coil 24 or 26 from the positive control line 22. The common relay contacts 25e open, turning the transistor 74 "on" and preventing the charging of the capacitor 70 and the triggering of the SCR 53 during the next positive wave form on positive armature line 45. The forward relay coil 24 or reverse relay coil 26 do not deactivate immediately, as the capacitor 36 or 40 respectively, constituting the delay means, discharge through the appropriate coil, tending to hold the coil in an actuated condition for a time interval after the forward or reverse relay coil 24 or 26 is operatively disconnected from the control voltage power supply 10.

This time interval allows the SCR 53 to turn off or commutate, shutting off the armature current before either the relay contacts 24c and 24d or 26c and 26d open.

When the forward and reverse relay coils 24 or 26 has deactivated, the contacts 24e and 26e are closed, causing the dynamic breaking resistor 51 to be connected across the motor armature winding 47. The motor armature winding 47 produces a current flow through the dynamic breaking resistor 51, causing energy to be dissipated and causing a voltage drop across the dynamic breaking resistor 51 which actuates the antiplugging relay coil 27. The antiplugging relay coil 27 opens the normally closed relay contacts 27a and 27b, preventing the motor from being restarted until the motor has nearly stopped and the current flowing in the motor armature winding 47 is insufficient to provide a large enough voltage drop across the dynamic breaking resistor 51 to actuate the antiplugging relay coil 27. At this point, the motor may be restarted in either the forward or reverse direction.

I claim as my invention:

1. In a directional control for a D.C. motor including a motor armature circuit having an armature winding:
   (a) a switching means operatively connected to the armature circuit for controlling the polarity of the direct current applied to the armature winding,
   (b) a SCR in the armature circuit to control the current of the armature circuit,
   (c) a control means operatively connecting the SCR to the switching means, the control means including a trigger means operatively connected to the SCR for providing a trigger signal to the SCR to turn on the SCR, and the control means operatively controlling the trigger means and the switching means for allowing the switching means to connect the armature winding in the armature circuit before a trigger signal is provided to the SCR,
   (d) the switching means including forward and reverse relay means that are selectively activated, and
   (e) the control means including a common relay means operatively connected to the forward and reverse relay means, and activated selectively by either the forward or reverse relay means for providing the trigger signal to the SCR after the forward or reverse relay means has been activated.

2. A direction control for a D.C. motor as defined in claim 1, in which:
   (f) the forward and reverse relay means includes sets of armature relay contacts selectively connecting the armature winding to the positive and negative sides of the armature circuit, the forward relay means when actuated closing the forward armature relay contacts to connect the armature winding to the armature circuit, and the reverse relay means when actuated closing the reverse armature relay contacts to connect the armature winding to the armature circuit, the forward and reverse armature relay contacts being closed before the trigger signal is provided to the SCR for precluding the contacts from making the D.C. current to the armature circuit,
   (g) the forward and reverse relay means includes control contacts operatively connected to the common relay means, the control contacts in the forward relay means actuating the common relay means upon actuation of the forward relay means, and the control contacts in the reverse relay means actuating the common relay means upon the actuation of the reverse relay means, and (h) the respective forward and reverse armature relay contacts operating approximately simultaneously, and the common relay means actuating a finite period of time after the actuation of the control contacts as determined by the operating time of the common relay means, said finite period of time providing a time lag between the closing of the forward and reverse armature relay contacts and the actuating of the trigger means by the common relay means to trigger the SCR.

3. A directional control for a D.C. motor as defined in claim 1, in which:

(f) the control means includes a stop switch means operatively connected to the common relay means for deactivation of the common relay means for commutating the SCR shutting off the current in the armature circuit before operatively disconnecting the armature winding from the armature circuit.

4. A directional control for a D.C. motor as defined in claim 3, in which:

(g) the control means includes a delay means operatively connected to the forward and reverse relay means providing a time interval between the deactivation of the common relay means and the deactivation of the selectively engaged forward or reverse relay means, said time interval being of sufficient length to allow the SCR to commutate shutting off armature current prior to operatively disconnecting the armature winding from the armature circuit by deactivation of the respective forward or reverse relay means.

5. A directional control for a D.C. motor as defined in claim 4, in which:

(h) a control voltage power supply is connected to the switching means and control means, (i) the forward and reverse relay means are actuated and deactivated by connection and disconnection to the control voltage power supply, and (j) the delay means includes a capacitor connected in parallel with the forward and reverse relay means which charges when the associated forward and reverse relay means is actuated, and which discharges through the associated forward and reverse relay means for retaining the associated forward and reverse relay means in an actuated condition for a predetermined time interval after the associated forward and reverse relay means is operatively disconnected from the control voltage power supply.

6. A direction control for a D.C. motor as defined in claim 1, in which:

(f) the forward and reverse relay means includes sets of armature relay contacts selectively connecting the armature winding to the positive and negative sides of the armature circuit, the forward relay means when actuated closing the forward armature relay contacts to connect the armature winding to the armature circuit, and the reverse relay means when actuated closing the reverse armature relay contacts to connect the armature winding to the armature circuit, the forward and reverse armature relay contacts being closed before the trigger signal is provided to the SCR for precluding the contacts from making the D.C. current to the armature circuit, (g) the forward and reverse relay means includes control contacts operatively connected to the common relay means, the control contacts in the forward relay means actuating the common relay means upon actuation of the forward relay means, and the control contacts in the reverse relay means actuating the common relay means upon the actuation of the reverse relay means, (h) the respective forward and reverse armature relay contacts operating approximately simultaneously, and the common relay means actuating a finite period of time after the actuation of the control contacts as determined by the operating time of the common relay means, said finite period of time providing a time lag between the closing of the forward and reverse armature relay contacts and the actuating of the trigger means by the common relay means to trigger the SCR, (i) the control means includes a stop switch means operatively connected to the common relay means for deactivation of the common relay means for commutating the SCR shutting off the current in the armature circuit before operatively disconnecting the armature winding from the armature circuit, (j) the control means includes a delay means operatively connected to the forward and reverse relay means providing a time interval between the deactivation of the common relay means and the deactivation of the selectively engaged forward or reverse relay means, said time interval being of sufficient length to allow the SCR to commutate shutting off armature current prior to operatively disconnecting the armature winding from the armature circuit by deactivation of the respective forward or reverse relay means, (k) a control voltage power supply is connected to the switching means and control means, (l) the forward and reverse relay means are actuated and deactivated by connection and disconnection to the control voltage power supply, and (m) the delay means includes a capacitor connected in parallel with the forward and reverse relay means which charges when the associated forward and reverse relay means is actuated, and which discharges through the associated forward and reverse relay means for retaining the associated forward and reverse relay means in an actuated condition for a predetermined time interval after the associated forward and reverse relay means is operatively disconnected from the control voltage power supply.

* * * * *